Figure 1:
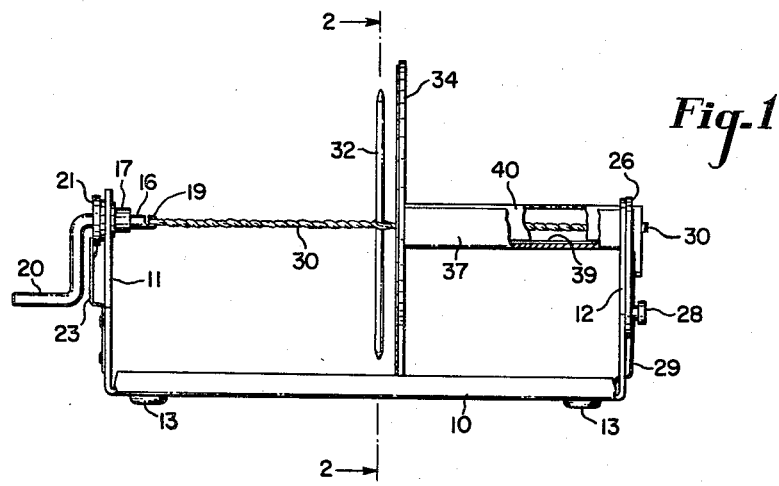

Sept. 11, 1962 J. R. LUCK ET AL 3,053,076
OZONE INDICATOR
Filed Oct. 27, 1960

INVENTORS
JAMES R. LUCK
ASBJORN M. SEVERSON
BY Robert S. Craig
ATTORNEY

United States Patent Office 3,053,076
Patented Sept. 11, 1962

3,053,076
OZONE INDICATOR
James R. Luck and Asbjorn M. Severson, Minneapolis, Minn., assignors to Minneapolis-Honeywell Regulator Company, Minneapolis, Minn., a corporation of Delaware
Filed Oct. 27, 1960, Ser. No. 65,402
4 Claims. (Cl. 73—23)

This invention is directed to a device for measuring the concentration of ozone in the atmosphere.

In order to determine the concentration of ozone in the atmosphere at remote desired locations an easily portable device is essential. Elaborate laboratory equipment obviously is unsuitable for this purpose. It is known that relaxation of a stretched thin rubber strip due to ozone attack proceeds with sufficient rapidity to be useful in determining ozone concentrations in the order of interest for most purposes.

The object of the invention is to provide a device for use in measuring the rate of relaxation of a stressed rubber strip due to attack by atmospheric ozone. The rate of relaxation is a function of ozone concentration, so that a rubber strip of predetermined section, length and composition, stressed to a predetermined extent, will relax at a rate indicative of ozone concentration.

The preferred embodiment of the invention comprises two strips of rubber stretched to approximately 100% elongation and twisted about the axis of the length thereof. Midway of the free length of the twisted strip a pointer in the form of a light weight rod extends between the strips and thus is supported to extend transversely thereof and cooperate with a scale. One of the ends of the twisted strip is shielded from ozone attack. The two lengths of twisted rubber strip on either side of the pointer are equally affected by environmental factors other than ozone, with the result that relaxation of the portion attacked by ozone will rotate the pointer at a rate which is a function of ozone concentration. The ozone concentration for any rate of pointer rotation is known from laboratory calibration of a device of the same configuration.

Since the pointer is supported by the rubber strips there are no pivots to cause frictional drag and impair the accuracy of the device. Likewise the lack of delicate pivots makes the device extremely rugged. The only delicate part is the rubber strip, which is replaced for each test.

The stretched and twisted configuration of the rubber strips with the pointer carried mid-way of the free length thereof results in greatly amplified movement of the pointer as compared with an arrangement in which motion is produced only by linear movement of the midpoint of the strip.

Relaxation of the twisted strip due to relaxation as a factor of the time alone is equal in the two portions of the strip and causes no rotation of the pointer. Rate of relaxation varies to some extent with humidity and temperature but these factors are minor in most situations and may be provided for in the calibration information if necessary.

Figure 2:
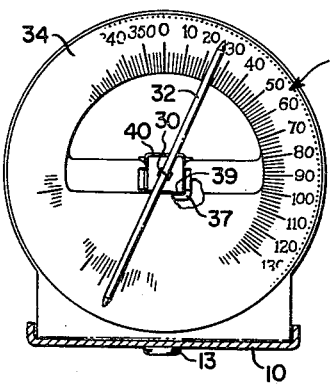
Figure 3:
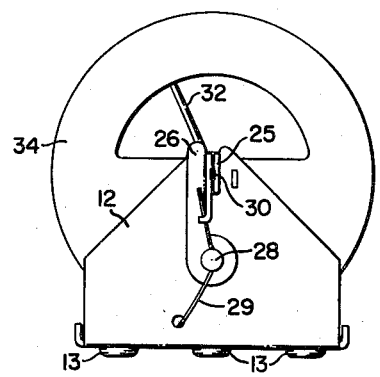
Figure 4:
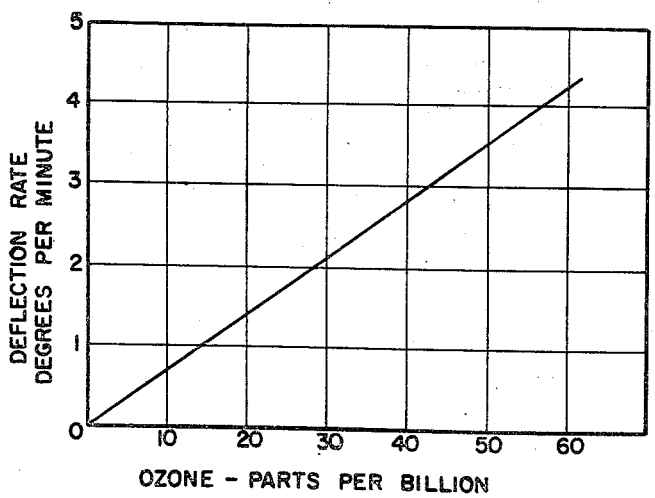

In the drawing:

FIGURE 1 is an elevation, partly in section, of an ozone indicator incorporating the present invention, FIGURE 2 is a section taken on line 2—2 of FIGURE 1, FIGURE 3 is an elevation taken from the right of FIGURE 1, and FIGURE 4 is a calibration chart for use with the device illustrated in FIGURES 1–3.

As seen in the drawing, a frame 10 in the form of a shallow sheet metal channel has upwardly extending end portions 11 and 12, and is provided with three rubber feet 13.

A shaft 16 is rotatably supported in a bushing 17 carried by the end portion 11. The inner end of shaft 16 is provided with a hook 19 while the outer end is in the form of a crank 20. A flange 21 prevents inward movement of the shaft 16, and is provided with a notch (not shown) which cooperates with a spring finger 23 secured to end portion 11 to provide a detent for shaft 16.

End portion 12 of frame 10 is provided with a spring loaded clamp in line with the axis of shaft 16. One jaw of the clamp is formed by an ear 25 bent outwardly from the material of end portion 12, while the other jaw of the clamp is provided by the upper end of a lever 26 pivoted in end portion 12 or a pin 28. As seen in FIGURE 3, the lever 26 is biased in a clockwise direction toward the ear 25 by a spring 29.

A strand 30 of rubber has its two free ends held together in the clamp, and is held at its mid-point in the hook 19 on the inner end of shaft 16. A pointer 32, in the form of a light weight rod, extends between the doubled rubber strands and is held in place by the strands being twisted together. The pointer is carried by the strands to a point mid-way of their free length, and also at the center of gravity of the pointer.

A scale plate 34 is carried by frame 10 and is disposed normal to the rubber strands and carries indicia 35 representing angular degrees about the longitudinal axis of the strands. The plate 34 is spaced from pointer 32 by a convenient distance and cooperates therewith to indicate the angular position of the pointer.

A rectangular channel 37 is supported by and extends horizontally between end portion 12 and scale plate 34 and is disposed that the rubber strands are substantially centrally located within the channel. The inner bottom surface of the channel 37 is covered by a flat rectangular piece of blotting paper 39, and an inverted channel of blotting paper 40 covers the inner side surfaces of channel 37 and extends across the top thereof. Thus, the right hand end of the rubber strands, as seen in FIGURE 1, are enclosed by blotting paper. The blotting paper is effective in absorbing ozone in this area and this end of the rubber strands is effectively shielded from ozone attack.

In the actual device illustrated, the free length of the twisted rubber strand between its supported ends is approximately five and seven-eighths inches, and the relaxed rubber strand, before doubling and securing in place, is six and one-quarter inches long. The strand is in the form of a flat strip available as "golf ball thread." After removing the channel-shaped piece of blotting paper 40, the rubber strand is secured in the clamp with approximately three-sixteenths of an inch of each of its free ends held inactive by the clamp, and stretched to approximately 100% elongation by securing its mid-point in the hook 19. The pointer 32 is placed between the two rubber strands so as to be parallel to and spaced about three-sixteenths of an inch from the scale plate. In the present example, the shaft 16 is turned forty revolutions by means of crank 20, preferably in a counterclockwise direction, and the twisted rubber strands inspected and manipulated if necessary to equalize the windings. The detent provided by spring finger 23 and the single notch in flange 21 facilitates counting the number of revolutions of shaft 16. The blotting paper 40 is then replaced and the position of the pointer with respect to indicia 35 noted.

The calibration chart shown in FIGURE 4 is applicable to the above described apparatus when operated as indicated and at the usually encountered indoor conditions of temperature and humidity. The time at which the pointer angle is first read is noted, an appropriate time allowed to elapse, and a second reading taken. Ozone concentration is found from the calibration chart when the angular deflection rate of the pointer in degrees per minute has been found. The total deflection of the pointer should be no more than ninety degrees to preserve calibration, as relaxation of the exposed part of the rubber strands beyond this deflection will change the deflection rate to an appreciable extent.

By supporting the pointer on the rubber strands pivot friction is entirely eliminated and accurate readings are easily obtained. Likewise, the twisted rubber strands produce a large pointer movement as the exposed strands relax so that inaccuracy due to reading errors is minimized.

We claim:

1. An ozone indicator comprising, spaced supports, a stretched and twisted rubber strip extending between said supports, a pointer carried by said rubber strip intermediate its ends and extending transversely thereof, a scale disposed to cooperate with said pointer and indicate angular movement thereof about an axis through the length of said strip, and an ozone shield disposed to protect a portion of said rubber strip between said pointer and one of said supports.

2. An ozone indicator comprising, spaced supports, two rubber strips equally stretched extending between said supports, said strips being twisted together throughout their free lengths, a pointer having a supporting portion extending between said rubber strips at a point intermediate said supports, a scale disposed to cooperate with said pointer and indicate angular movement thereof about an axis through the length of said strips, and an ozone shield disposed to protect a portion of the lengths of said rubber strips between said pointer and one of said supports.

3. An ozone indicator comprising, a frame, spaced supports on said frame, one of said supports being rotatable in said frame on an axis in line with the other of said supports, a stretched rubber strip extending between said supports, means for turning said rotatable support to twist said rubber strip, a pointer carried by said rubber strip intermediate its ends and extending transversely thereof, a scale carried by said frame transversely of said strip and disposed to cooperate with said pointer to indicate angular movement of the intermediate portion of said strip, and an ozone shield disposed to protect a portion of said rubber strip between said pointer and one of said supports.

4. An ozone indicator comprising, a frame, spaced supports on said frame, one of said supports being rotatable in said frame on an axis in line with the other of said supports, two rubber strips of equal and uniform section equally stretched extending between said supports, a pointer having a supporting portion extending between said rubber strips at a point intermediate said supports, means for turning said rotatable support to twist said rubber strips together throughout their free lengths to hold said pointer therebetween, a scale carried by said frame and disposed to cooperate with said pointer, and an ozone shield disposed to protect a portion of the lengths of said rubber strips between said pointer and one of said supports.

References Cited in the file of this patent

UNITED STATES PATENTS 2,768,068     Juve et al.                Oct. 23, 1956